(12) United States Patent
Sugihara (10) Patent No.: US 6,842,194 B1
(45) Date of Patent: Jan. 11, 2005

(54) INVERSE TELECINE CONVERSION APPARATUS

(75) Inventor: Motooki Sugihara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 122 days.

(21) Appl. No.: 09/723,281

(22) Filed: Nov. 28, 2000

(30) Foreign Application Priority Data

Dec. 2, 1999 (JP) .......................................... 11-343819

(51) Int. Cl.$^7$ ................................................ H04N 7/01
(52) U.S. Cl. ........................ 348/441; 348/558; 348/459
(58) Field of Search ................................ 348/558, 441, 348/459, 526, 700, 97, 96; 386/131, 129; 382/181

(56) References Cited

U.S. PATENT DOCUMENTS

| | | | | |
|---|---|---|---|---|
| 4,998,167 A | * | 3/1991 | Jaqua | 358/140 |
| 5,689,301 A | * | 11/1997 | Christopher et al. | 348/97 |
| 6,055,018 A | * | 4/2000 | Swan | 348/448 |
| 6,115,499 A | * | 9/2000 | Wang | 382/232 |
| 6,380,978 B1 | * | 4/2002 | Adams et al. | 348/452 |
| 6,538,688 B1 | * | 3/2003 | Giles | 348/97 |

* cited by examiner

*Primary Examiner*—Victor R. Kostak
(74) *Attorney, Agent, or Firm*—Morgan, Lewis & Bockius LLP (57) ABSTRACT

An inverse telecine conversion arrangement and methodology that accurately judges whether entered moving television picture information is originally a television material or a cinematic material, and performs inverse telecine conversion based on a result of the judgement. The apparatus includes a structure judging portion which judges whether a structure is a frame structure or a field structure based on adjacent pieces of field image information in the received moving television picture information which are adjacent to each other in terms of time; and a pattern judging portion which determines that the received moving television picture information has a predetermined pattern based on a pattern in which a field structure and a frame structure judged by the structure judging portion are successive to each other, and when the pattern judging portion recognizes the predetermined pattern, a corresponding piece of the received moving television picture information is inverse telecine converted.

6 Claims, 12 Drawing Sheets

INVERSE TELECINE CONVERSION APPARATUS

BACKGROUND OF THE INVENTION

1. Field of the Invention

The present invention relates to an inverse telecine conversion apparatus, for use in a recording apparatus using an MPEG (Moving Picture Expert Group) encoding technique such as a DVD (Digital Versatile Disk) recorder, which converts moving television pictures simulated from cine-frame images into the original cine-frame images.

2. Description of Related Art

Moving pictures of a cinematic film that are cinematic materials are displayed on a screen with 24 frames per second of display information shown continuously over time.

Figure 1:
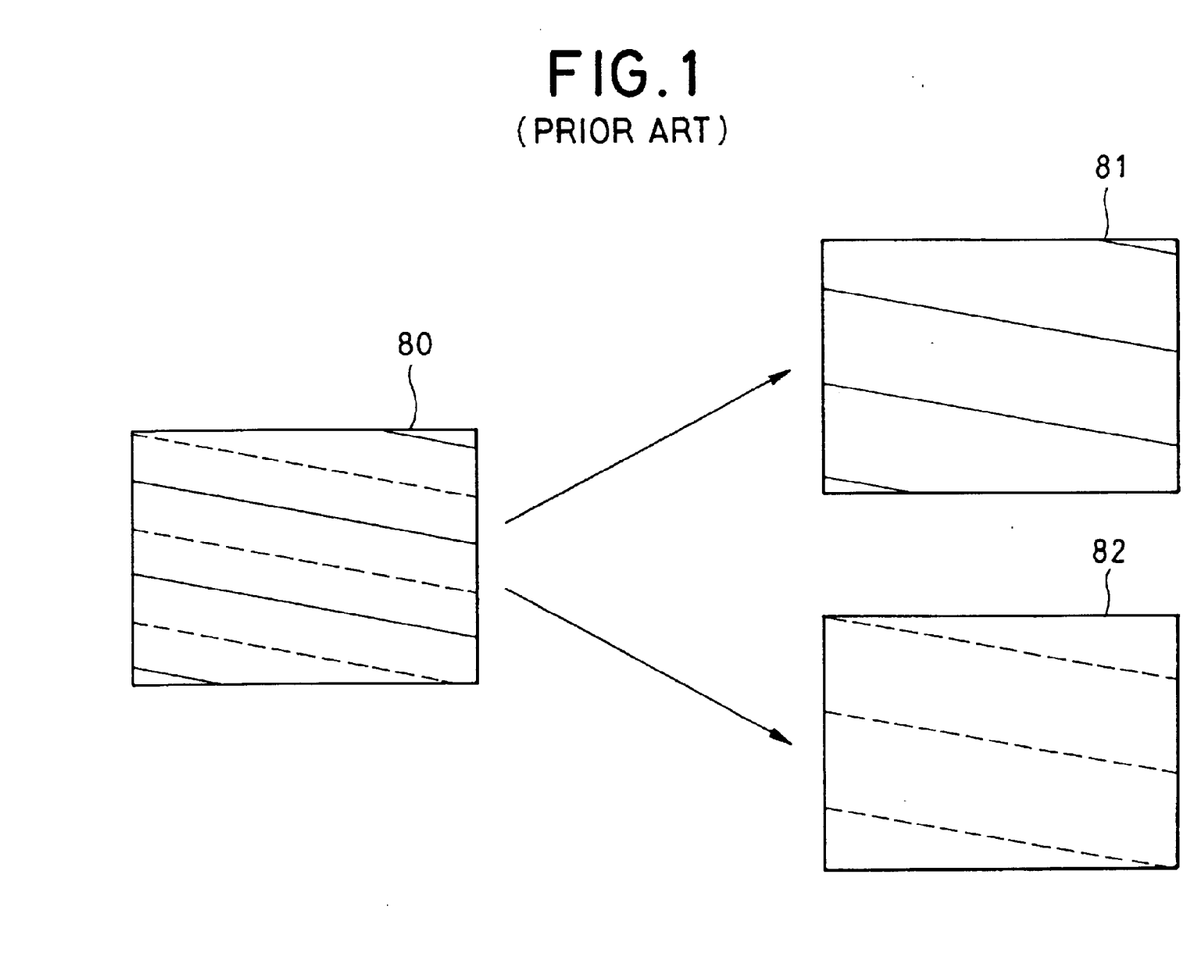
FIG. 1 is a conceptual diagram for describing a structure of a frame image information in a moving television picture information.

On the other hand, moving television pictures which are television materials are displayed with 30 frames of image information (hereinafter "frame image information") per second, continuously over time on a display. As shown in FIG. 1, top field image information 81 and bottom field image information 82 are combined with each other and scanned over, thereby defining frame image information 80.

Figure 2:
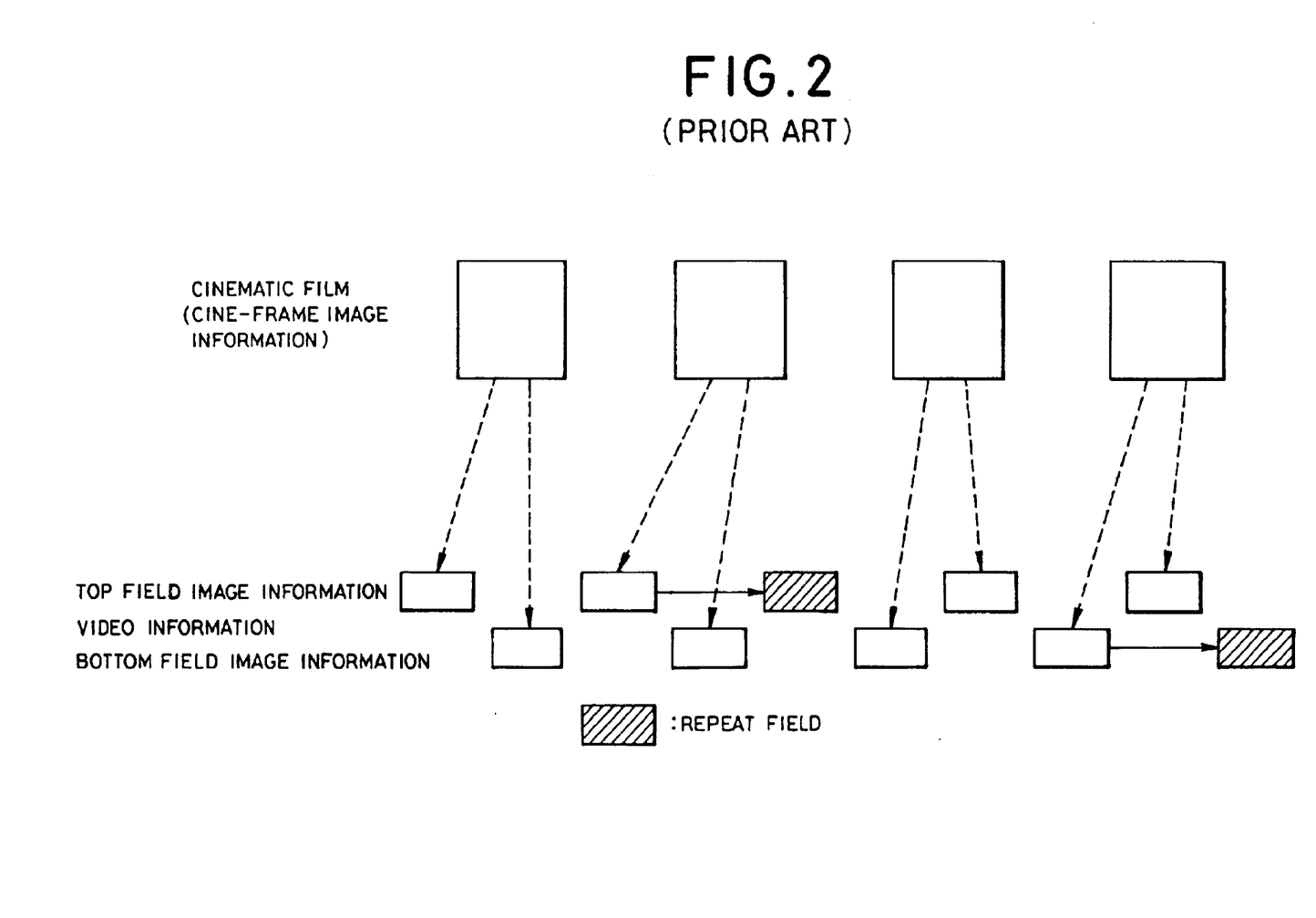
FIG. 2 is a conceptual diagram for describing a conventional telecine conversion method.

When television video moving pictures (30 frames per second) are to be created from a cinema film (24 cine-frames per second), because of the difference in the number of images per second as described above, a conversion method such as that shown in FIG. 2 (hereinafter "telecine conversion") is customarily used. That is, cine-frame image information is replaced with top field image information (the top ones of video fields shown in FIG. 2) or bottom field image information (the bottom ones of the video fields shown in FIG. 2). In addition, repeat field image information is inserted for every five pieces of the field image information. As the repeat field image information, there are two types, i.e., one that immediately precedes top field image information (the field image information two pieces back) is repeated as the top field image information again and the other that immediately precedes bottom field image information (the field image information two pieces back) is repeated as the bottom field image information again. In the following, moving television picture information created in such a manner from a cinema film will be referred to as "a pseudo moving television picture information."

Incidentally, DVD is becoming increasingly popular at a rapid pace these days. This has made it necessary, for creation of DVD moving picture software (video contents) from conventional pseudo moving television picture information, to delete repeat field image information which is contained in pseudo moving television picture information and to convert it back into image information that is 24 cine-frames per second (hereinafter referred to as "inverse telecine conversion"). The reason is as described below.

1) While DVD requires the compression (encode) of image information, compression efficiency is better if pseudo moving television picture information is compressed after converting the pseudo moving television picture information back into cinema moving picture information at 24 cine-frames per second not including redundant information than if pseudo moving television picture information of at frames per second is compressed as it contains repeat field image information, and therefore, picture quality is better even when the volume of data is the same.

2) During frame-by-frame reproduction with a DVD reproducing apparatus (player), it is possible to reproduce a cinematic film frame by frame.

Figure 3:
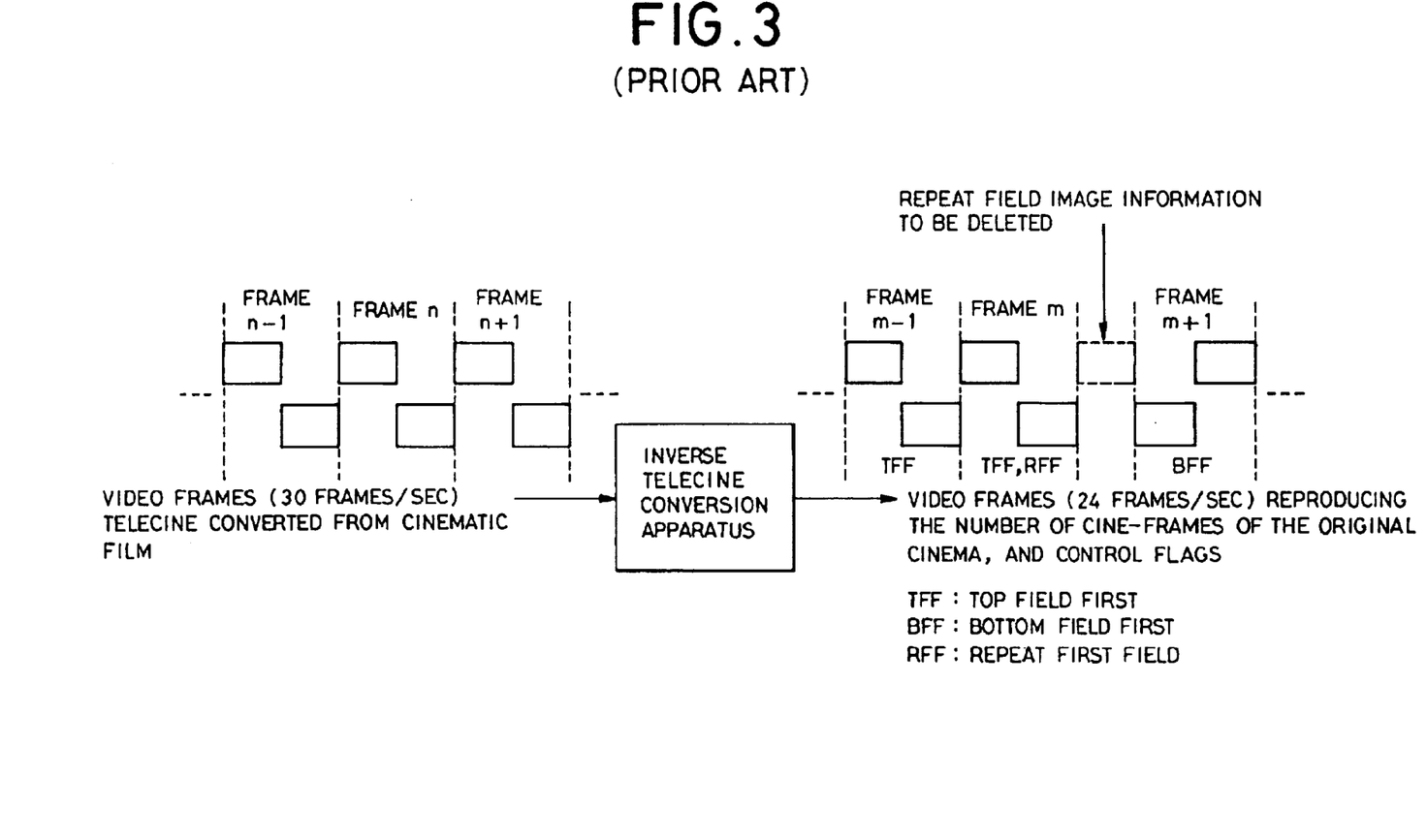
FIG. 3 is a conceptual diagram for describing a conventional inverse telecine conversion method.

FIG. 3 is a drawing conceptually describing inverse telecine conversion in a conventional inverse telecine conversion apparatus. As shown in FIG. 3, pseudo moving television picture information (video frame: 30 frames/sec) telecine converted from a cinematic film is supplied to the inverse telecine conversion apparatus, repeat field image information is deleted as denoted by the dotted frame shown in FIG. 3, and the pseudo moving television picture information is converted into image information reproducing the original 24 cine-frames/sec cinema film.

Further, at the same time, control flags which are necessary for re-conversion of the 24 cine-frames/sec image information into 30 frames/sec moving television picture information are generated and added. In FIG. 3, a control flag TFF triggers an operation that top field image information is processed with priority within a frame with the control flag TFF. Meanwhile, a control flag BFF triggers an operation that bottom field image information is processed with priority within a frame with the control flag BFF. A control flag RFF triggers an operation that the first filed image information of a frame with the control flag RFF serves as repeat field image information.

As described above, since repeat field image information which is inserted during conventional inverse telecine conversion has a fixed cycle and a fixed position, utilizing this, inverse telecine conversion is realized with a method (hereinafter "constant cycle field deletion method") that "deletes field image information which is at a certain fixed position for every five fields."

Incidentally, a television program is broadcasted with TV commercials (CM) and announcements for other programs, which are originally television materials, inserted within a cinema film which originally is a cinematic material. That is, in general, a mixture of television materials and cinematic materials are broadcasted within a series of programs. Where a program in which images which originally are video materials and images which originally are cinematic materials are mixed with each other is to be recorded with a recording apparatus which uses an MPEG encoding technique such as a DVD recorder, since a conventional inverse telecine conversion apparatus assumes that entered moving television picture information is all cinematic material, the conventional inverse telecine conversion apparatus deletes a field representing a true frame image which should not be deleted instead of deleting a supplementary field which is contained in pseudo moving television picture information, or deletes fields at a constant cycle even if the fields are originally television materials. Thus, there is a problem that the compression efficiency when compressing MPEG images or picture quality deteriorates due to the deletion of information which should be left undeleted.

SUMMARY OF THE INVENTION

The present invention has been made to solve the problem above. Accordingly, an object of the present invention is to provide an inverse telecine conversion apparatus which accurately judges whether entered moving television picture information is originally television material or cinematic material and performs inverse telecine conversion based on a result of the judgement.

To solve the problem described above, an inverse telecine conversion apparatus according to a first aspect of the present invention is an inverse telecine conversion apparatus for inverse telecine conversion of received moving television picture image information, which comprises: a structure judging means which judges whether a structure is a frame structure or a field structure based on adjacent pieces of field image information in the received moving television picture information which are adjacent to each other as to time; and pattern judging means which determines that the received moving television picture information has a predetermined pattern based on a pattern in which a field structure and a frame structure judged by the structure judging means are successive to each other, and when the pattern judging means recognizes the predetermined pattern, a corresponding piece of the received moving television picture information is inverse telecine converted.

According to a second aspect of the present invention, in the inverse telecine conversion apparatus described above, the structure judging means comprises: judgement-purpose frame generation means which generates judgement-purpose frame image information based on adjacent pieces of field image information in the received moving television picture information which are adjacent to each other in terms of time; and an orthogonal transformation means which performs orthogonal transformation on the judgement-purpose frame image information, and when high-order coefficients in a vertical direction among coefficients within a frequency domain obtained as a result of the orthogonal transformation exhibit a predetermined characteristic, it is judged that the judgement-purpose frame image information is a field structure in which repeat field image information is contained within either one of the pieces of the field image information.

According to a third aspect of the present invention, in the inverse telecine conversion apparatus according to the first aspect, the predetermined characteristic of the high-order coefficients in the vertical direction is characterized by a provision of larger absolute values than a predetermined threshold value.

According to a fourth aspect of the present invention, in the inverse telecine conversion apparatus according to the first aspect, the predetermined characteristic of the high-order coefficients in the vertical direction is provision of larger absolute values than corresponding coefficients of adjacent pieces of the judgement-purpose frame image information which are adjacent to each other as to time.

In a fifth aspect of the present invention, in the inverse telecine conversion apparatus according to the first aspect, "a frame structure," "a field structure," "a frame structure," "a frame structure" and "a field structure" appear in this order in the predetermined pattern.

DETAILED DESCRIPTION OF THE PREFERRED EMBODIMENT

In the following, an embodiment of an inverse telecine conversion apparatus according to the present invention will be described with reference to the associated drawings.

Figure 4:
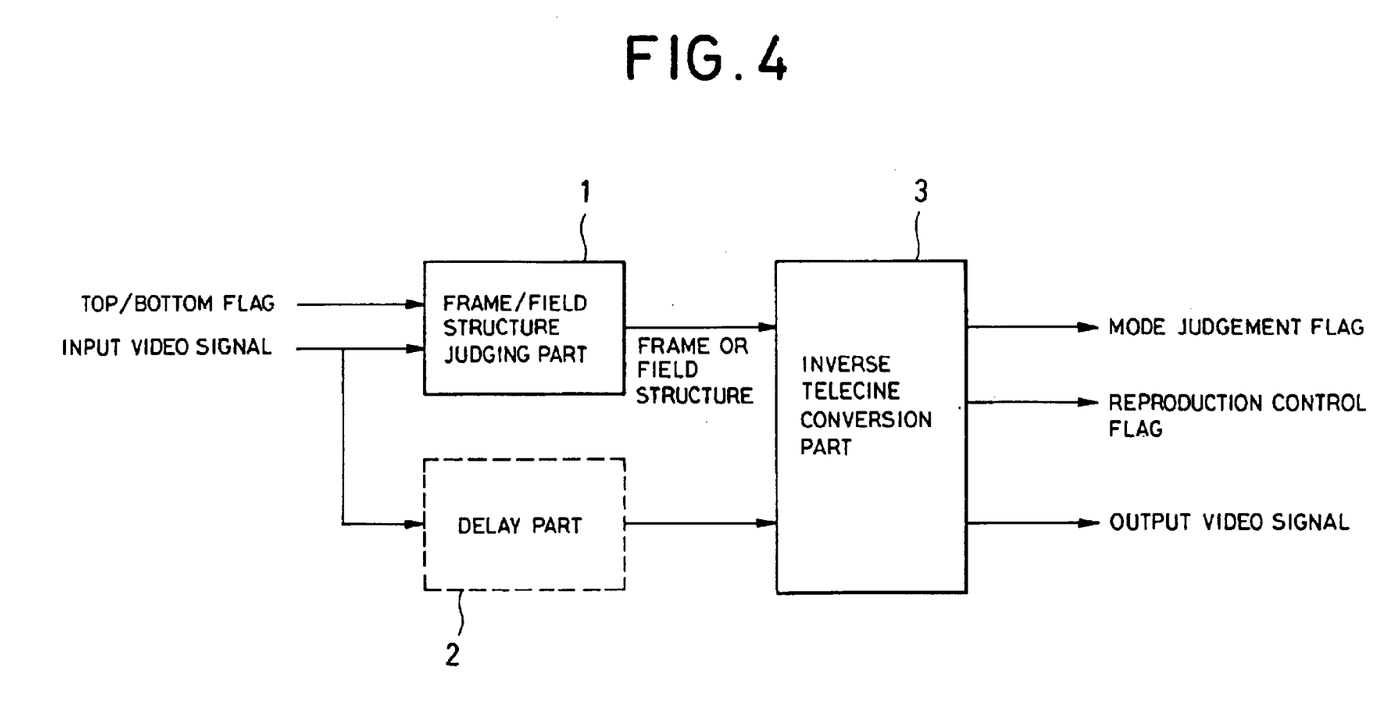
FIG. 4 is an overall structure diagram of an inverse telecine conversion apparatus according to the present invention.

FIG. 4 is an overall structure diagram of the inverse telecine conversion apparatus. As shown in FIG. 4, the apparatus comprises a frame/field structure judging part 1, a delay part 2, and an inverse telecine conversion part 3.

First, the frame/field structure judging part 1 develops frame image information for judgement from adjacent pieces of field image information which are adjacent to each other in terms of time within entered moving television picture information, and judges a frame/field structure in the frame image information for judgement.

The inverse telecine conversion part 3, using a result of the judgement which the frame/field structure judging part 1 made regarding the frame/field structure, judges whether an input video signal supplied through the delay part 2 is a television material or a cinematic material by means of judgement processing which will be described later, and inverse-telecine converts a cinematic material.

Figure 5:
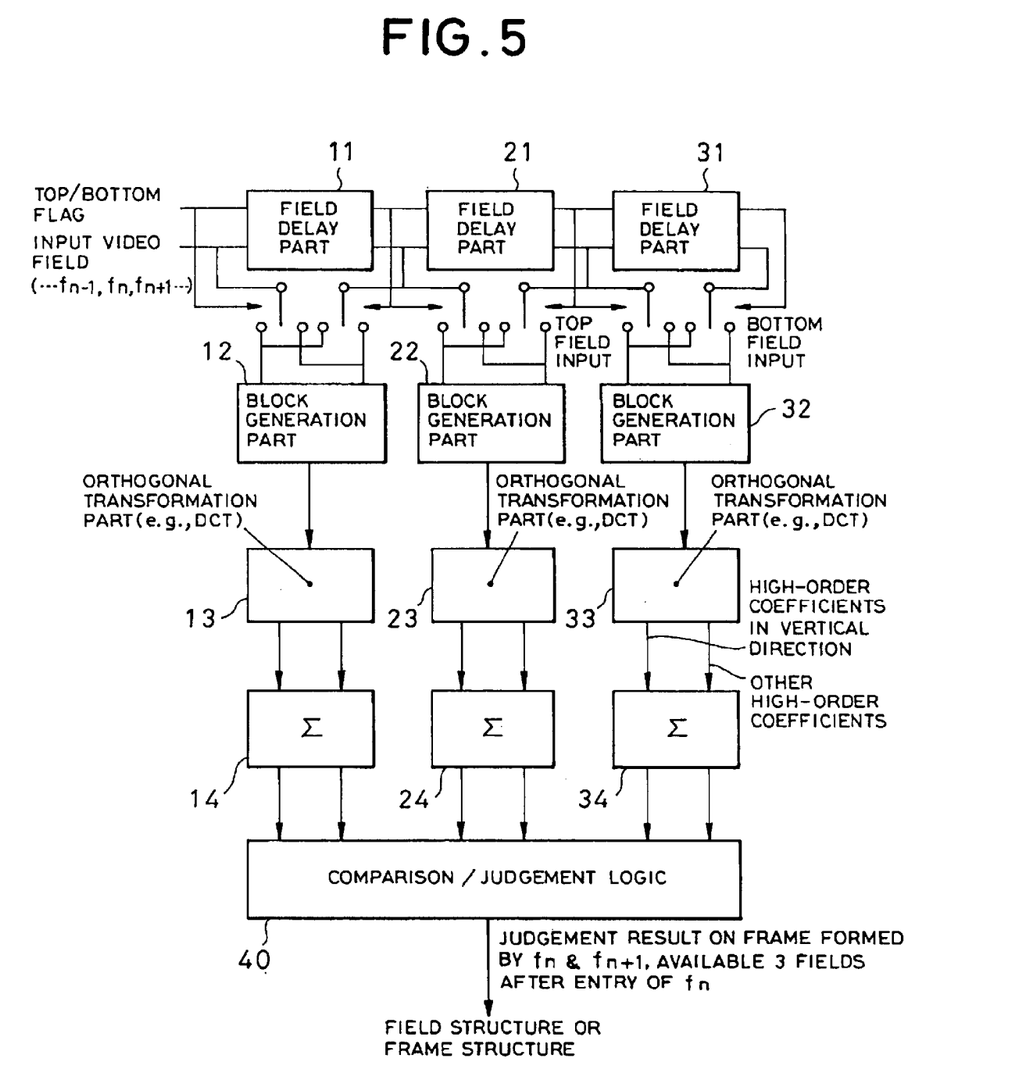
FIG. 5 is a block diagram showing a structure of a frame/field structure judging part shown in FIG. 4.

FIG. 5 is a block diagram showing a structure of the frame/field structure judging part 1. As shown in FIG. 5, the frame/field structure judging part 1 comprises field delay parts 11, 21 and 31, block generation parts 12, 22 and 32, orthogonal transformation parts 13, 23 and 33, synthetic parts 14, 24 and 34, and a comparator 40.

Now, the structure and a function of the frame/field structure judging part 1 will be described in detail with reference to the associated drawings.

The field delay part 11 and the block generation part 12 are supplied with top field image information or bottom field image information of moving television picture information. Further, the field delay parts 11, 21 and 31 are equipped with a function of delaying and thereafter outputting received information.

An output from the field delay part 11 is supplied to the field delay part 21 and the block generation parts 12 and 22. Meanwhile, an output from the field delay part 21 is fed to the field delay part 31 and the block generation parts 22 and 32. An output from the field delay part 31 is supplied to the block generation part 32.

An output from the block generation part 12 is supplied to the orthogonal transformation part 13, an output from the orthogonal transformation part 13 is supplied to the synthetic part 14, and an output from the synthetic part 14 is supplied to the comparator 40.

In a similar manner, an output from the block generation part 22 is supplied to the orthogonal transformation part 23, an output from the orthogonal transformation part 23 is supplied to the synthetic part 24, and an output from the synthetic part 24 is supplied to the comparator 40.

On the other hand, an output from the block generation part 32 is supplied to the orthogonal transformation part 33, an output from the orthogonal transformation part 33 is supplied to the synthetic part 34, and an output from the synthetic part 34 is supplied to the comparator 40.

Figure 6:
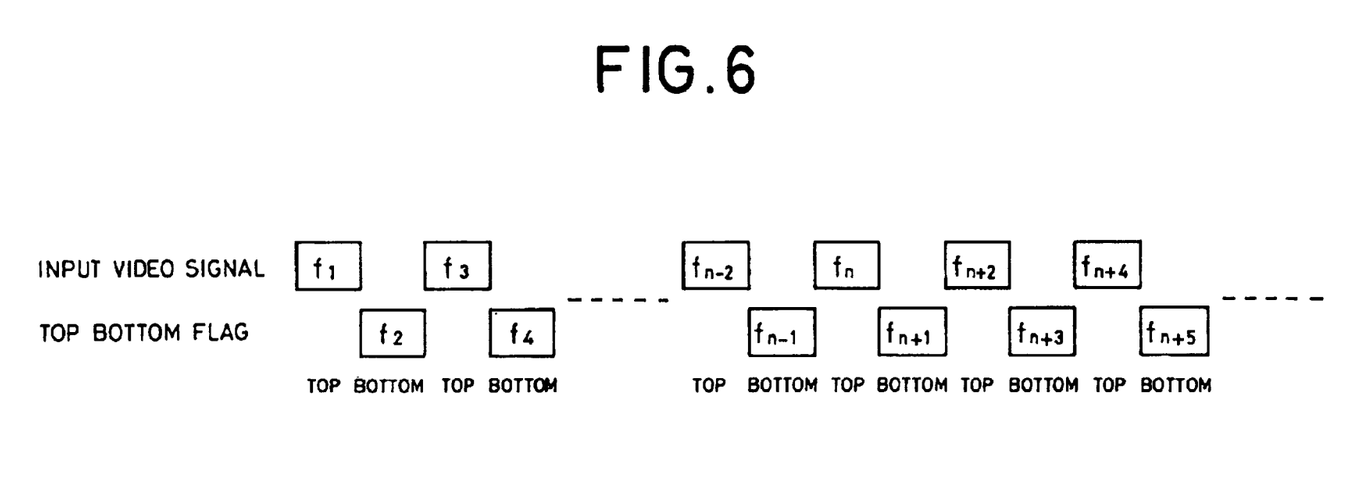
FIG. 6 is a conceptual diagram for describing moving television picture information supplied to the inverse telecine conversion apparatus which is shown in FIG. 4, and associated flags.

FIG. 6 is a conceptual diagram for describing moving television picture information supplied to the inverse telecine conversion apparatus which is shown in FIG. 4, and associated flags. In FIG. 6, denoted at $f_1, \ldots f_n, \ldots$ are field image information supplied to the inverse telecine conversion apparatus which is shown in FIG. 4, of which upper ones are top field image information while the lower ones are bottom field image information. In the following, $f_n$ will represent an n-th piece of the field image information (hereinafter abbreviated as "field n").

Figure 7:
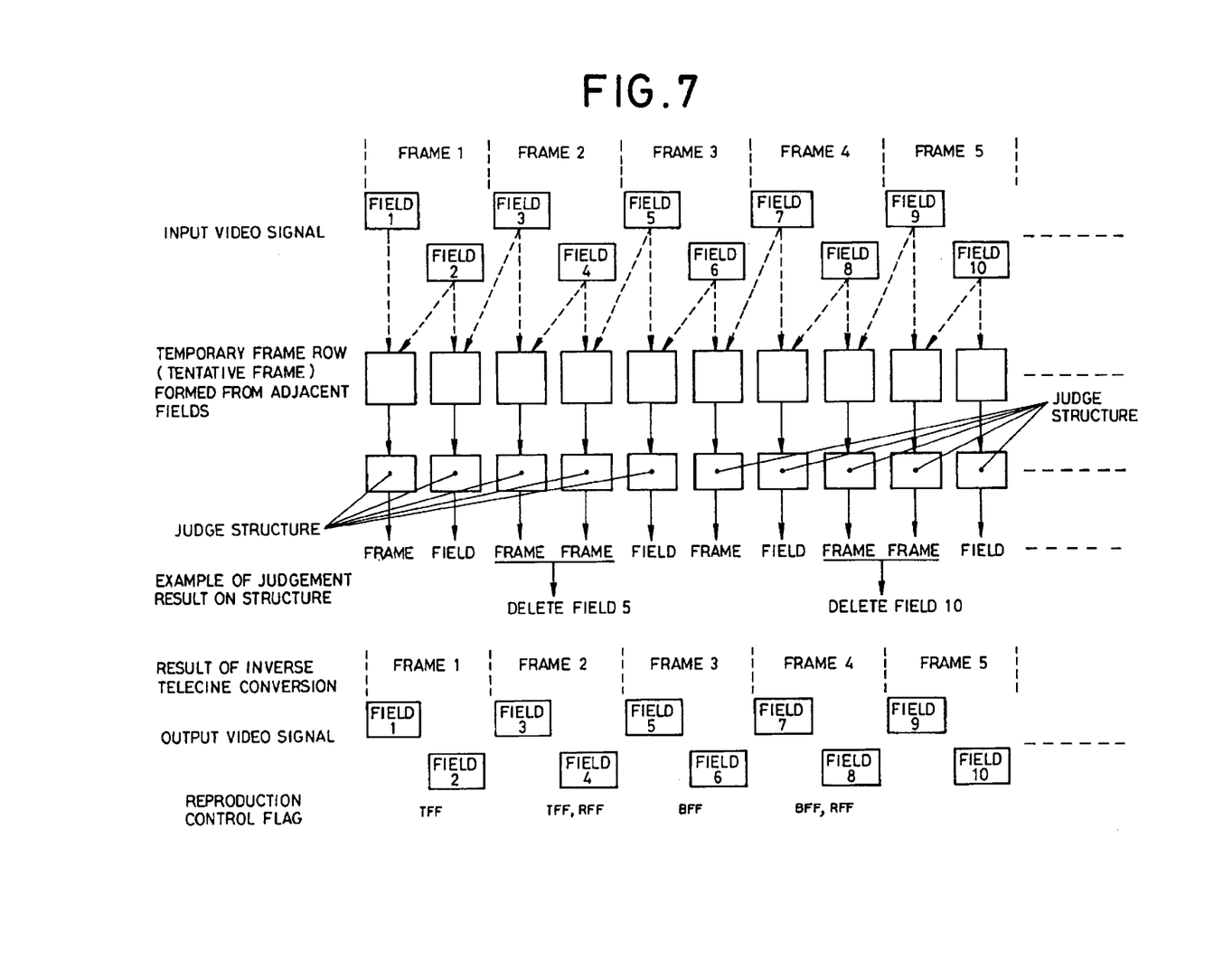
FIG. 7 is a conceptual diagram for describing an outline of an operation of the inverse telecine conversion apparatus which is shown in FIG. 4.

FIG. 7 is a conceptual diagram for describing an outline of an operation of the inverse telecine conversion apparatus which is shown in FIG. 4. As shown in FIG. 7, the field delay parts 11, 21 and 31 and the block generation parts 12, 22 and 32 generate tentative frame image information from adjacent pieces of field image information which are adjacent to each other in terms of time.

For example, a field 1 and a field 2 which are adjacent to each other as to time are combined with each other to develop tentative frame image information 1 (hereinafter abbreviated as "tentative frame 1"), a field 2 and a field 3 are combined with each other to develop a tentative frame 2, and in a similar manner, a field n and a field$_{n+1}$ are combined with each other to develop a tentative frame n. In the following, the tentative frame image information will be referred to as "frame image information for judgement."

Next, the orthogonal transformation parts 13, 23 and 33, the synthetic parts 14, 24 and 34, and the comparator 40 judge the structures of the frame image information for judgement. If the two pieces of the field image information forming a certain piece of the frame image information for judgement are both originally cine-frame images of a cinema film, this frame image information for judgement forms true frame image information, and therefore, will hereinafter be referred to as "a frame structure."

Conversely, if one of the two pieces of the field image information is a different frame image or a repeat field inserted during telecine conversion although the other of the two pieces of the field image information is originally a cine-frame image of the cinema film, this frame image information for judgement does not form true frame image information, and therefore, does not represent images which are continuous in terms of time. This frame image information for judgement is merely a combination of pieces of field image information which are discontinuous in terms of time, and therefore, will hereinafter be referred to as "a field structure."

Figure 8:
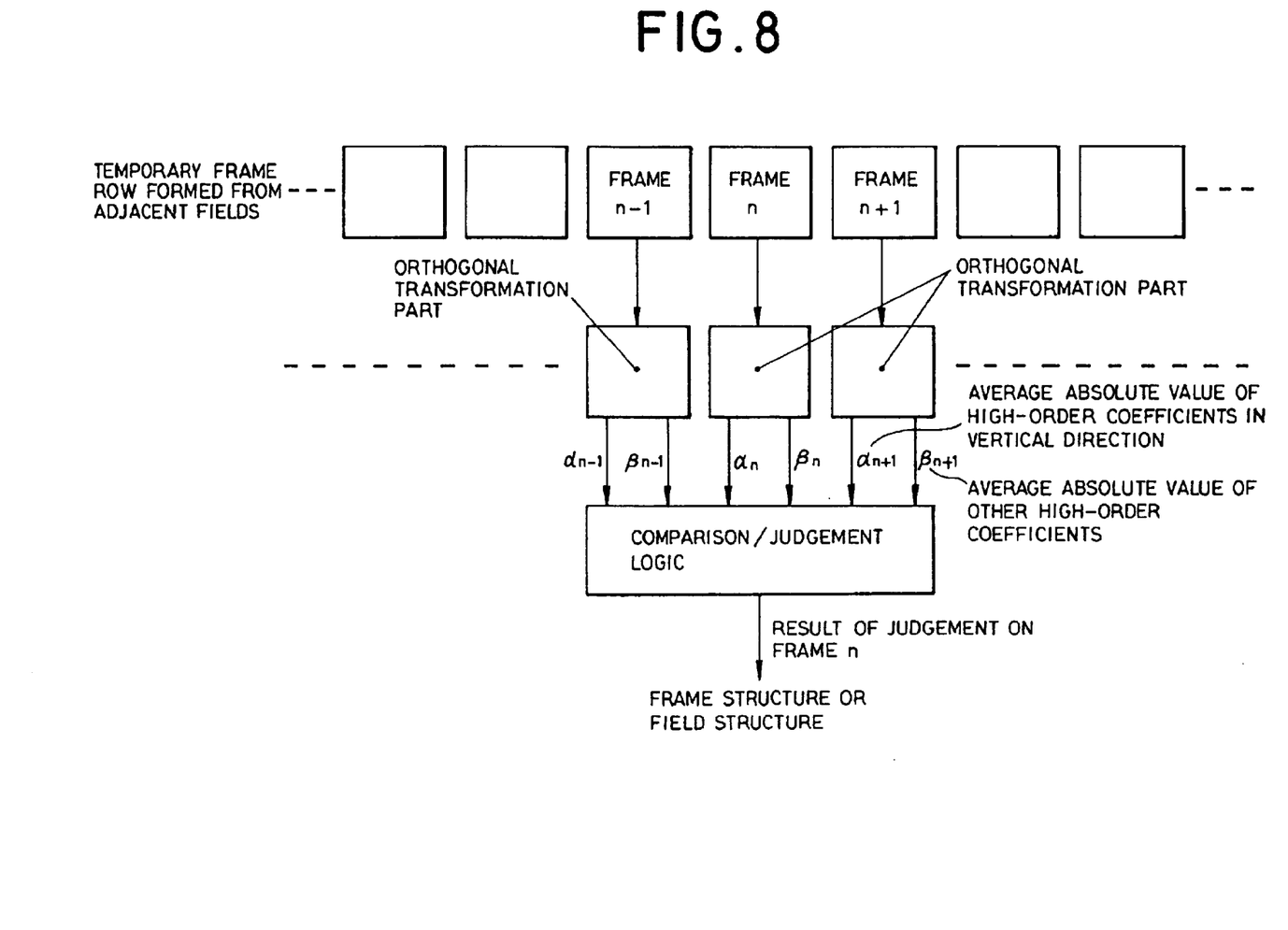
FIG. 8 is a conceptual diagram for describing a method of judging a structure of an established temporary frame in the frame/field structure judging part shown in FIG. 4.

FIG. 8 is a conceptual diagram for describing a method of judging a structure of frame image information in the frame/field structure judging part 1 which is shown in FIG. 4. First, the frame image information for judgement developed from the adjacent field image information as described above is orthogonally converted by the orthogonal transformation parts 13, 23 and 33.

Figure 9:
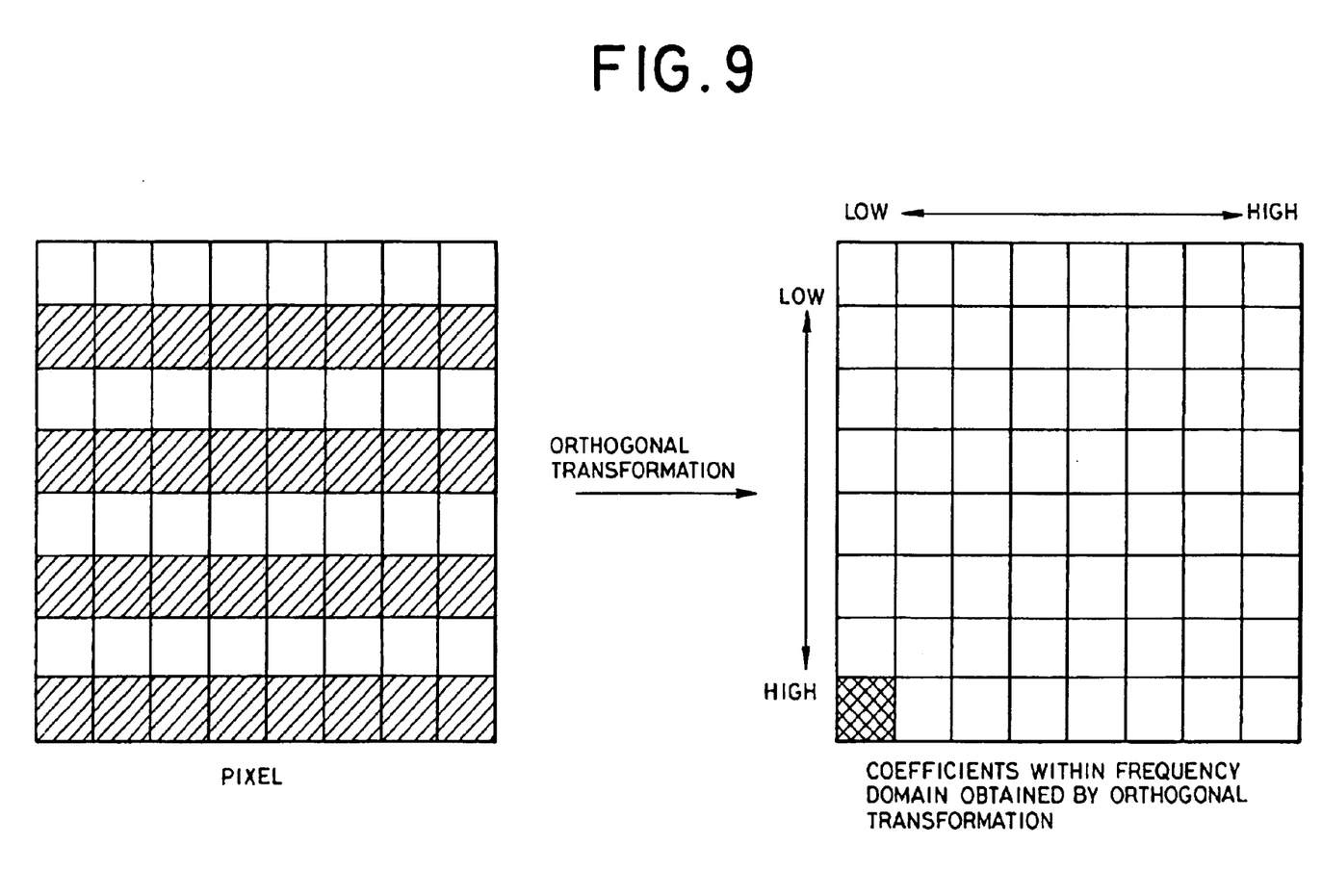
FIG. 9 is a conceptual diagram for describing a method of judging a structure of frame image information in the frame/field structure judging part shown in FIG. 4.

Orthogonal transformation is conversion according to which coefficients within a frequency domain are obtained from pixels of frame image information as shown in FIG. 9, and includes DCT (Discrete Cosine Transformation), Fourier transformation, etc.

When the frame image information for judgement is a field structure, while one of the two pieces of the field image information is originally a cine-frame image of the cinema film, the other one of the two pieces of the field image information is repeated field image information inserted during telecine conversion (the field image information two pieces back).

In other words, since the top field image information and the bottom field image information forming the frame image information for judgement which is a field structure are not successive images as to time, when viewed as pixels, they appear as shown on the left-hand side in FIG. 9. In FIG. 9, unhatched horizontal rows represent one piece of the field image information (the top field image information, for instance) while hatched horizontal rows represent the other piece of the field image information (the bottom field image information, for instance). In this manner, the similarity is low in the vertical direction (top-bottom direction) in FIG. 9, which means that the information changes greatly in the vertical direction (top-bottom direction).

Even images whose original images have only a few movements, if considered in terms of luminance, exhibit a similar characteristic to the above. Hence, when the frame image information for judgement is a field structure, luminance information changes greatly in the vertical direction (top-bottom direction) in FIG. 9.

As the frame image information having a pixel structure as that shown on the left-hand side in FIG. 9 is orthogonally transformed, coefficients within a frequency domain such as these shown on the right-hand side in FIG. 9 is obtained. In the right-hand side half in FIG. 9, coefficients in the vertical direction are higher order coefficients from above toward below. Coefficients in the horizontal direction are higher order coefficients from the left-hand side toward the right-hand side.

When the frame image information for judgement is a field structure, the high-order coefficients in the vertical direction show a unique tendency.

That is, the values of the coefficients in the vicinity of the left-hand side bottom corner in the right-hand side half of FIG. 9 exhibit a unique tendency. For instance, while the absolute values of the high-order coefficients in the vertical direction are smaller than a predetermined threshold value in the case of a true frame structure, the absolute values may sometimes exceed the predetermined threshold value in the case of a field structure.

Alternatively, comparing adjacent pieces of the frame image information for judgement, the absolute values of the same corresponding coefficients may sometimes be large values in the case of a field structure.

The frame/field structure judging part according to the present embodiment, noting the high-order coefficients in the vertical direction among the coefficients within the frequency domain which are obtained as a result of orthogonal transformation, determines that "the frame image information for judgement is a field structure" when these high-order coefficients show such a predetermined characteristic as described above.

Figure 10:
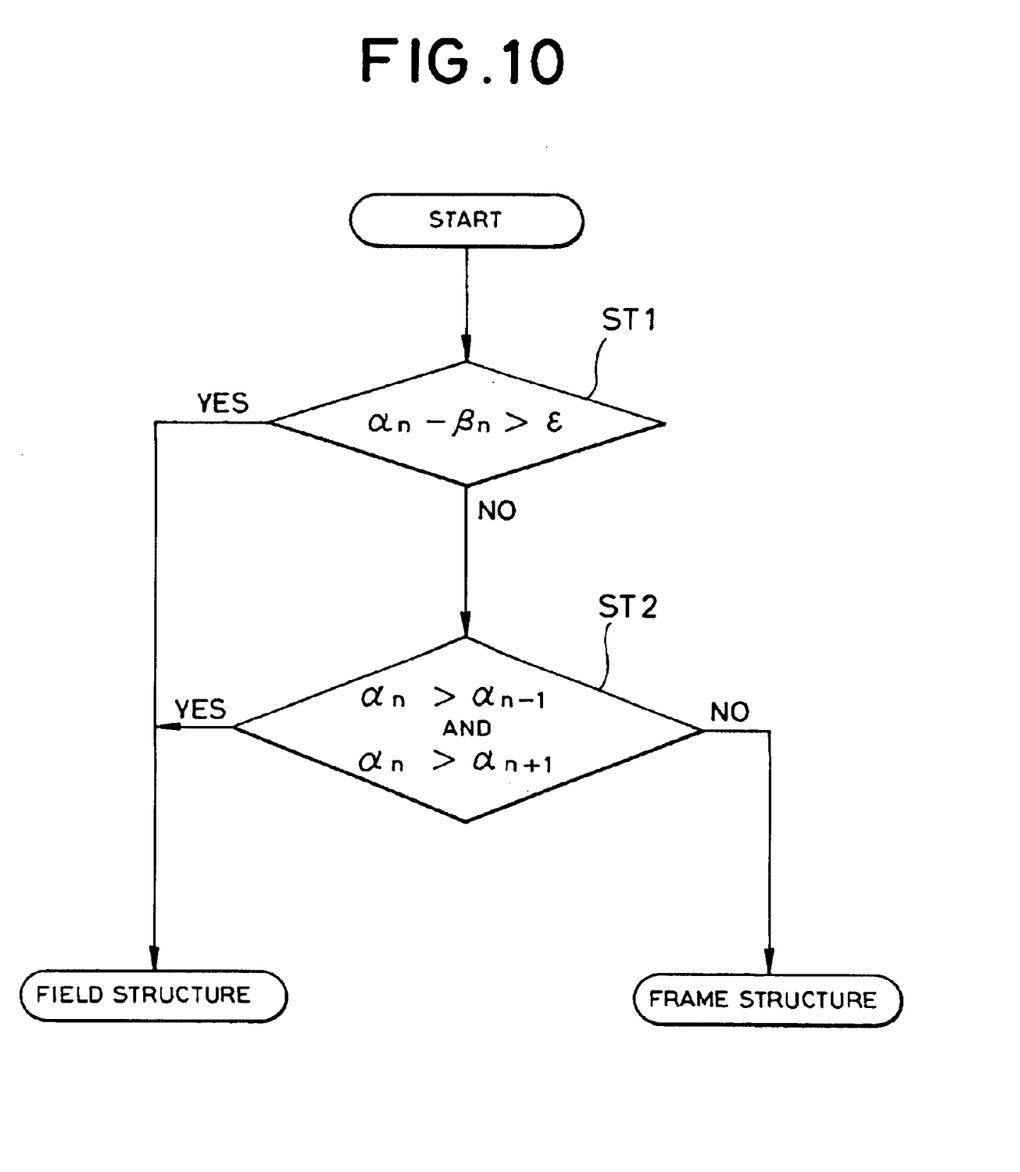
FIG. 10 is a conceptual diagram for describing logic for comparing and judging a frame/field structure shown in FIG. 8.

FIG. 10 shows an example of the comparison/judgement logic which is shown in FIG. 8. An average absolute value $\alpha n$ of the high-order coefficients in the vertical direction regarding the frame n which is orthogonally transformed as shown in FIG. 8 is compared with an average absolute value $\beta n$ of the other high-order coefficients, and the frame n is determined to be a field structure if there is a remarkable difference between $\alpha n$ and $\beta n$ (step ST1; Yes).

Even though the difference between αn and βn is not remarkable, if αn is larger than both αn−1 and βn+1 which are the same coefficients regarding a frame which is adjacent to the frame n, it is determined that the frame n is a field structure (step ST2; Yes).

The double judgement is exercised, once at the step ST1 and again at the step ST2 as described above. This is because with respect to a scene with particularly few movements in a cinematic material, due to an unremarkable difference between αn and βn in a temporary frame which is built over two frames of the film, it is possible that the step ST1 above alone will provide an incorrect judgement. However, when the coefficients are compared with the same coefficients of the adjacent frames (any one of which must correspond to one frame of the film), if αn is found to be dominant, it is possible to determine that the frame n is a field structure as a result of the step ST2 despite the judgement result (step ST1; No) of the step ST1 which has determined that the frame n is a frame structure.

Next, with reference to FIG. 11, a description will be given on an example of an inverse telecine conversion algorithm used in the inverse telecine conversion part 3 shown in FIG. 4, which requires to judge whether entered moving television picture information is a cinematic material or a television material based on a judgement result on the structure outputted from the frame/field structure judging part 1, and if the moving television picture information is a cinematic material, to detect and delete a repeat field inserted during telecine conversion.

A counter n is n=1 while a mode judgement flag denotes a television mode at the start. First, a state 0 ($S_0$) is executed.

In the state 0, the structure of frame image information for judgement formed by $f_n$ (field n) and $f_{n+1}$ (field n+1) is judged. When the structure is determined to be "a field structure" as a result of this, $f_n$ and $f_{n+1}$ are treated as one frame, a control flag $FLAG_n$ is added, and the mode judgement flag is set to the television mode. The control flag $FLAG_n$ expresses the control flag TFF described earlier when $f_n$ is a top field but expresses the control flag BFF described earlier when $f_n$ is a bottom field. As post-processing, the field counter n is advanced two for subsequent processing. This corresponds to sending an output video signal of one frame. On the contrary, if it is determined that the structure is "a frame structure" as a result of the state 0 judgement, the sequence proceeds to a state 1 ($S_1$).

In the state 1, the structure of frame image information for judgement formed by $f_{n+1}$ (field n+1) and $f_{n+2}$ (field n+2) is judged. When the structure is determined to be "a field structure" as a result of this, $f_n$ and $f_{n+1}$ are treated as one frame and the control flag $FLAG_n$ is added. As post-processing, the field counter n is advanced two (which corresponds to sending the output video signal one frame), and the sequence proceeds to state 0. On the contrary, if it is determined that the structure is "a frame structure" as a result of the state 1 judgement, the sequence proceeds to state 2 ($S_2$).

In state 2, the structure of frame image information for judgement formed by $f_{n+2}$ (field n+2) and $f_{n+3}$ (field n+3) is judged. When the structure is determined to be "a frame structure" as a result of this, $f_n$ and $f_{n+1}$ are treated as one frame and the control flag $FLAG_n$ is added. In addition, $f_{n+2}$ and $f_{n+3}$ are treated as one frame and a control flag $FLAG_{n+2}$ is added. The mode judgement flag is set to the television mode. As post-processing, the field counter n is advanced four (which corresponds to sending the output video signal two frames), and the sequence proceeds to state 0. On the contrary, if it is determined that the structure is "a field structure" as a result of the state 2 judgement, the sequence proceeds to a state 3 ($S_3$).

In state 3, the structure of frame image information for judgement formed by $f_{n+3}$ (field n+3) and $f_{n+4}$ (field n+4) is judged. When the structure is determined to be "a frame structure" as a result of this, $f_n$ and $f_{n+1}$ are treated as one frame and the control flags $FLAG_n$ and RFF are added. As post-processing, the field counter n is advanced three (which corresponds to sending the output video signal one frame and deleting $f_{n+2}$), and the sequence proceeds to state 1. On the contrary, if it is determined that the structure is "a field structure" as a result of the state 3 judgement, $f_n$ and $f_{n+1}$ are treated as one frame and the control flag $FLAG_n$ is added. In addition, $f_{n+2}$ and $f_{n+3}$ are treated as one frame and the control flag $FLAG_{n+2}$ is added. The mode judgement flag is set to the television mode, the field counter n is advanced four (which corresponds to sending the output video signal two frames), and the sequence proceeds to state 0.

According to the inverse telecine conversion algorithm described above, when entered moving television picture information is a cinematic material, repeat field image information inserted during telecine conversion is deleted.

FIG. 7 shows an example of conversion in the case of a cinematic material, according to the inverse telecine conversion algorithm described above.

When entered moving television picture information is a cinematic material, the structure of the frame image information for judgement repeats a pattern of "frame structure"-"field structure"-"frame structure"-"frame structure"-"field structure."

According to the inverse telecine conversion algorithm described above, when the structure of the frame image information for judgement has the pattern above, after state 0, state 1, state 0, state 1, state 2, state 3, state 1, . . . transitions are a repetition of state 0, state 1, state 2, state 3 and state 1.

At a transition from state 3 to state 1, the control flag RFF is added, and the next top field is deleted if the control flag $FLAG_n$ is TFF but the next bottom field is deleted if the control flag $FLAG_n$ is BFF, i.e., the repeat field image information inserted during telecine conversion is deleted.

When entered moving television picture information is a television material, the structure of the frame image information for judgement has a different pattern from that of a cinematic material, and therefore, a transition from state 3 to state 1 does not occur. Thus, in the case of a television material, since deletion of fields is not performed, there is no chance that information that should remain will be missing.

Figure 11:
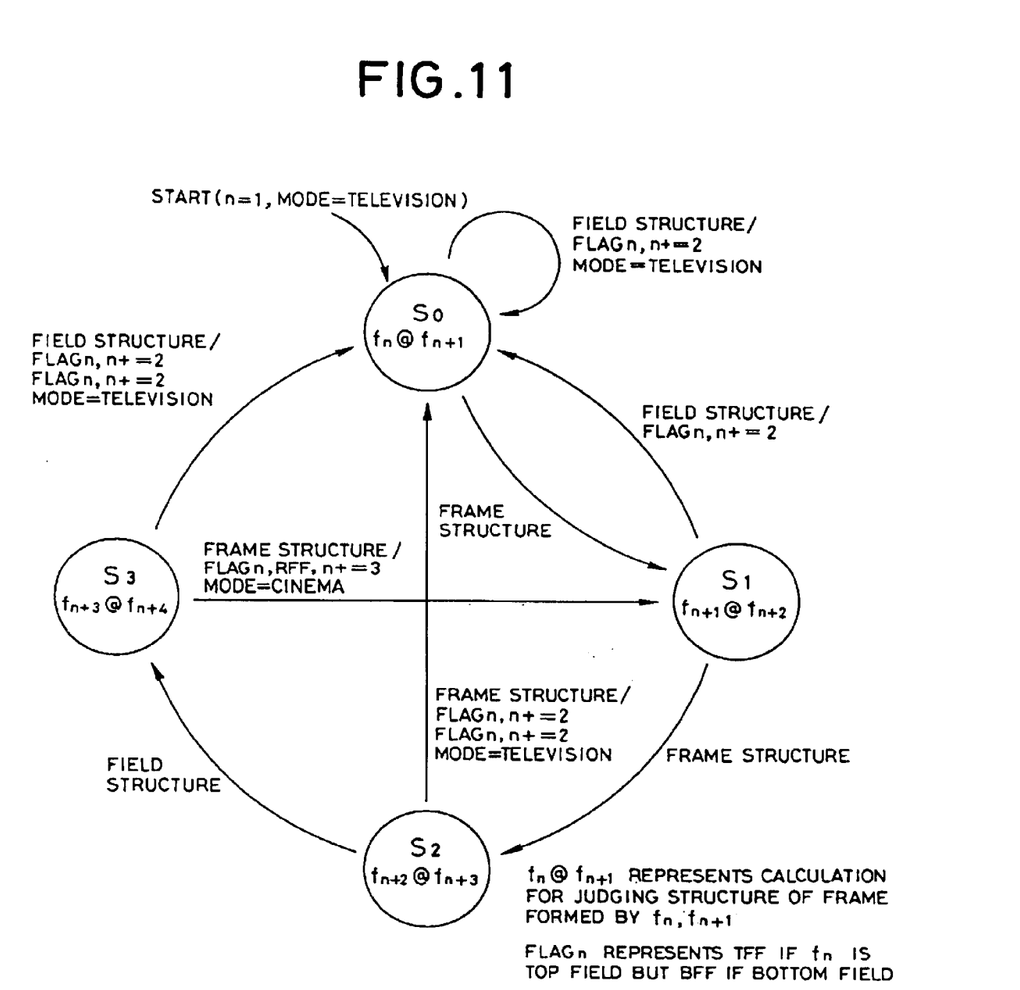
FIG. 11 is a first conceptual diagram for describing an example of an inverse telecine conversion algorithm in an inverse telecine conversion part shown in FIG. 4.
Figure 12:
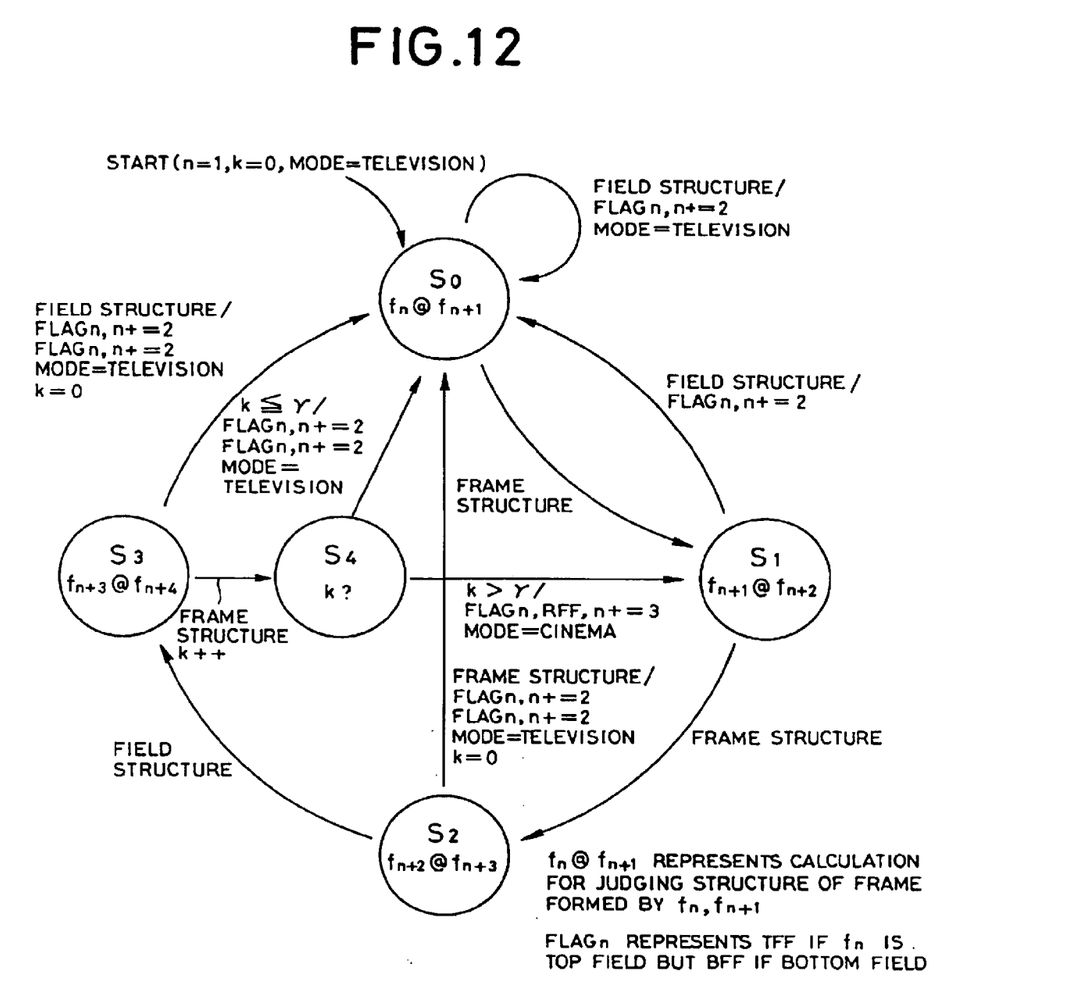
FIG. 12 is a second conceptual diagram for describing an example of the inverse telecine conversion algorithm in the inverse telecine conversion part shown in FIG. 4.

Further, in the inverse telecine conversion algorithm shown in FIG. 11, a conversion sensitivity fÁ may be set at a transition from state 3 to state 1 as shown in FIG. 12.

Denoted at k is a cinematic material pattern detecting counter which is advanced when it is determined that the structure is "a frame structure" as a result of the state 3 judgement. The symbol γ is a constant which expresses the conversion sensitivity of the inverse telecine conversion, which has a value of 0 or larger. Once a count of the cinematic material pattern detecting counter k exceeds the γ-value, deletion of repeat field image information inserted during telecine conversion starts.

While this is for avoiding deletion of necessary fields caused by an incorrect detection of a cinematic material pattern, if γ is set too large, the efficiency of the inverse telecine conversion becomes low. The smaller γ is, the higher the conversion sensitivity is. When γ is 0, as in the inverse telecine conversion algorithm shown in FIG. 11, as soon as a cinematic material pattern is detected even only once, repeat field image information inserted during telecine conversion is deleted.

In addition, the cinematic material pattern detecting counter k is 0 at the start, and reset to 0 at a transition from the state 2 to the state 0 and a transition from the state 3 to the state 0.

The present invention is not limited to the embodiment described above. The embodiment described above is simply an example. The technical scope of the present invention includes any modification which substantially shares the same structure with the technical concept defined in the appended claims and which has a similar effect.

As described above, according to the present invention, for recording with a recording apparatus using an MPEG encoding technique such as a DVD recorder, it is possible to accurately judge whether entered moving television picture information which is mixture of television and cinematic materials is originally a television material or a cinematic material and thereafter inverse-telecine convertion is performed originally on a cinematic material alone, and therefore, deterioration in a compression efficiency or a picture quality is reduced.

What is claimed is:

1. An inverse telecine conversion apparatus for inverse telecine conversion of received moving television picture information, comprising:

structure judging means for judging whether a structure is a frame structure or a field structure based on adjacent pieces of field image information in said received moving television picture information which are adjacent to each other in terms of time;

pattern judging means for determining that said received moving television picture information has a predetermined pattern based on a pattern in which a field structure and a frame structure judged by said structure judging means are successive to each other; and means for performing an inverse telecine conversion of a corresponding piece of said received moving television picture information when said pattern judging means recognizes said predetermined pattern.

2. An inverse telecine conversion apparatus for inverse telecine conversion of received moving television picture information, comprising:

structure judging means for judging whether a structure is a frame structure or a field structure based on adjacent pieces of field image information in said received moving television picture information which are adjacent to each other in terms of time;

pattern judging means for determining that said received moving television picture information has a predetermined pattern based on a pattern in which a field structure and a frame structure judged by said structure judging means are successive to each other; and means for performing an inverse telecine conversion of a corresponding piece of said received moving television picture information when said pattern judging means recognizes said predetermined pattern, wherein said structure judging means comprises:

judgement-purpose frame generation means which generates judgement-purpose frame image information based on adjacent pieces of field image information in said received moving television picture information which are adjacent to each other in terms of time; and orthogonal transformation means which performs orthogonal transformation on said judgement-purpose frame image information, and when high-order coefficients in a vertical direction among coefficients within a frequency domain obtained as a result of said orthogonal transformation exhibit a predetermined characteristic, said structure judging means judges that said judgement-purpose frame image information is a field structure in which repeat field image information is contained within either one of the pieces of said field image information.

3. The inverse telecine conversion apparatus of claim 2, wherein said predetermined characteristic of said high-order coefficients in the vertical direction is characterized by a provision of larger absolute values than a predetermined threshold value.

4. The inverse telecine conversion apparatus of claim 2, wherein said predetermined characteristic of said high-order coefficients in the vertical direction is characterized by a provision of larger absolute values than corresponding coefficients of adjacent pieces of said judgement-purpose frame image information which are adjacent to each other in terms of time.

5. The inverse telecine conversion apparatus of claim 1, wherein "a frame structure," "a field structure," "a frame structure," "a frame structure" and "a field structure" appear in this order in said predetermined pattern.

6. A method for performing inverse telecine conversion of received moving television picture information, comprising the steps of:

judging whether a structure is a frame structure or a field structure based on adjacent pieces of field image information in said received moving television picture information which are adjacent to each other in terms of time;

determining that said received moving television picture information has a predetermined pattern based on a pattern in which a field structure and a frame structure judged by said step for judging are successive to each other; and performing an inverse telecine conversion of a corresponding piece of said received moving television picture information when said predetermined pattern is recognized in said step of determining.

* * * * *